US010038689B1

(12) United States Patent
Chan et al.

(10) Patent No.: US 10,038,689 B1
(45) Date of Patent: Jul. 31, 2018

(54) DYNAMIC PASSWORD GENERATION

(71) Applicant: International Business Machines Corporation, Armonk, NY (US)

(72) Inventors: Yuk L. Chan, Rochester, NY (US); Michael D. Essenmacher, Danbury, CT (US); David B. Lection, Raleigh, NC (US); Eric L. Masselle, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/858,639

(22) Filed: Dec. 29, 2017

Related U.S. Application Data

(63) Continuation of application No. 15/698,205, filed on Sep. 7, 2017.

(51) Int. Cl.
*H04L 29/06* (2006.01)
*G06F 21/31* (2013.01)

(52) U.S. Cl.
CPC .......... *H04L 63/083* (2013.01); *G06F 21/316* (2013.01); *G06F 2221/2103* (2013.01)

(58) Field of Classification Search
None
See application file for complete search history.

(56) References Cited

U.S. PATENT DOCUMENTS

| 7,874,011 | B2 | | 1/2011 | Boss et al. | |
|---|---|---|---|---|---|
| 8,955,058 | B2 | * | 2/2015 | Castro | H04L 63/08 726/17 |
| 9,152,775 | B1 | * | 10/2015 | Kronrod | G06N 5/025 |
| 9,202,173 | B1 | * | 12/2015 | Dotan | G06N 5/02 |
| 2016/0048665 | A1 | | 2/2016 | Alshinnawi et al. | |
| 2017/0289168 | A1 | * | 10/2017 | Bar | H04L 63/0853 |
| 2017/0317993 | A1 | * | 11/2017 | Weber | H04L 63/06 |

OTHER PUBLICATIONS

Andrabi et al., "Usability of Augmented Reality for Revealing Secret Messages to Users but Not Their Devices," Symposium on Usable Privacy and Security (SOUPS) 2015, Jul. 22-24, 2015, Ottawa, Canada, pp. 89-102.
Babic et al., "Building Robust Authentication Systems With Activity-Based Personal Questions," SafeConfig '09, Nov. 9, 2009, Chicago, IL, pp. 19-23, © 2009 ACM.
(Continued)

*Primary Examiner* — Henry Tsang
(74) *Attorney, Agent, or Firm* — James L. Olsen (57) ABSTRACT

Aspects of the present disclosure relate to dynamically generating a security challenge and corresponding password. A set of user activity data may be obtained from one or more data sources. The set of user activity data may then be analyzed. Based on the analysis, a security rating may be generated for the user activity data. The security rating may be compared to a security threshold to determine whether the set of user activity data is secure. In response to the security rating satisfying the security threshold, the security challenge and password corresponding to the security challenge may be generated based on the set of user activity data.

1 Claim, 7 Drawing Sheets

(56) References Cited

OTHER PUBLICATIONS

Hang et al., "I Know VVhat You Did Last Week! Do You? Dynamic Security Questions for Fallback Authentication on Smartphones," Smart Smartphone Authentication, CHI 2015: Proceedings of the 33rd Annual ACM Conference on Human Factors in Computing Systems, pp. 1383-1392, CHI 2015, Apr. 18-23, 2015, Crossings, Seoul, Korea. http://dx.doi.org/10.1145/2702123.2702131.

Hang et al., "Where Have You Been? Using Location-Based Security Questions for Fallback Authentication," Symposium on Usable Privacy and Security (SOUPS) 2015, Jul. 22-24, 2015, Ottawa, Canada, pp. 169-183.

Woo et al., "Life-Experience Passwords (LEPs)," Symposium on Usable Privacy and Security (SOUPS) 2014, Jul. 9-11, 2014, Menlo Park, CA, pp. 1-2.

Mell et al., "The NIST Definition of Cloud Computing," Recommendations of the National Institute of Standards and Technology, Special Publication 800-145, Sep. 2011, 7 pages, National Institute of Standards and Technology, Gaithersburg, MD.

Chan et al., "Dynamic Password Generation," U.S. Appl. No. 15/698,205, filed Sep. 7, 2017.

List of IBM Patents or Patent Applications Treated as Related, Signed Dec. 19, 2017, 2 pages.

\* cited by examiner

DYNAMIC PASSWORD GENERATION

BACKGROUND

The present disclosure relates generally to the field of computer security, and more particularly to security challenge generation.

Passwords can be used to authenticate users. A typical password includes a string of characters and/or numbers that are validated in order to permit a user to access one or more computer resources. Passwords are commonly used during log-in processes, to facilitate access to computer resources such as accounts, databases, networks, websites, and applications. Various additional authentication methods exist, including security challenges, biometric scanners, multi-factor authentication, and security dongles.

SUMMARY

Embodiments of the present disclosure include a method, computer program product, and system for dynamic security challenge generation. The method may include obtaining a set of user activity data from one or more sources. The set of user activity data may be analyzed. Based on the analysis of the set of user activity data, a security rating may be generated. The security rating may then be compared to a security threshold to determine whether the user activity data is secure. In response to a determination that the set of user activity data is secure, the security challenge and a password corresponding to the security challenge may be generated based on the set of user activity data.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

FIG. 1-1 illustrates a block diagram of an exemplary computing environment in which illustrative embodiments of the present disclosure may be implemented.

FIG. 1-2 illustrates a block diagram of a password generation application communicatively coupled to one or more sources, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of computer security, and in particular to security challenge generation. While the present disclosure is not necessarily limited to such applications, various aspects of the disclosure may be appreciated through a discussion of various examples using this context.

Digital security mechanisms, such as passwords, are frequently used to authenticate users to one or more computer resources (e.g., devices, accounts, websites, and applications). The management of passwords can be difficult however, due to the increasing number of security requirements (e.g., expiration time, password length, and password format) associated with passwords. Even with the heightened security requirements, passwords can still be routinely broken by conventional hacking technology and methods (e.g., viruses, phishing, and brute-force cracking).

Additionally, personal security challenges such as, "What town did you grow up in?" are known by many individuals, which can pose a risk for password security. Personal security challenges may be administered for password resets, stand-alone passwords, and two-factor authentication. Implementing security challenges for password resets can be particularly problematic, however, as many individuals know the answers to the security challenges, or can quickly glean the answers by browsing related online accounts (e.g., social media posts, pictures, and descriptions). Therefore, if a malicious party knows or discovers the answers to the security challenges, the passwords corresponding to an account may be reset by the party, compromising the account. Accordingly, a convenient, yet secure approach to password generation may be beneficial.

Embodiments of the present disclosure address issues with manual security challenges and traditional passwords through automated security challenge and password generation. Specifically, embodiments provide methods for dynamically generating security challenges and passwords based on daily activities of multiple individuals. The details of daily activities can be obtained from a variety of data sources (e.g., video cameras, social media, digital calendars/events, application data, etc.), and can be used to generate security challenges and passwords. Accordingly, a user need not memorize or meticulously organize passwords for specific accounts, as passwords can be dynamically generated based on recent events. Further, the automatically generated security challenges may be more secure than preexisting security challenges. Specifically, various details of the user activities (e.g., daily or routine activities) may be analyzed to determine whether the user activity is suitable for security challenge and/or password generation. In some embodiments, the number of entities (e.g., individuals and artificial intelligence platforms) with knowledge of the user activity and/or the number of sources the user activity was obtained from may be considered for security purposes. If the user activity data is determined to be secure, one or more security challenges and/or corresponding passwords may be generated based on the details of the user activity.

The generated security challenges and passwords corresponding to the security challenges may be administered as stand-alone passwords or may be integrated into any other suitable authentication method (e.g., multi-factor authentication, biometric scanners, etc.). That is, in some embodiments, the security challenges and passwords may be administered in addition to existing account passwords (e.g., for an additional validation mechanism or a password-reset option).

Aspects of the present disclosure allow dynamic password generation without requiring user intervention. Specifically, a user may not need to manually define security challenges or passwords, as previously done (e.g., Question: "What was your first pet?" User Answer: A puppy). Further, manual security challenges could be arbitrarily defined, in that the answer defined by the user may not correspond to the security challenge (e.g., Question: "What model was your first car?" User Answer: Red), and thus could lead to users forgetting the answers to the challenges and/or requiring meticulous organization of the answers to the challenges for multiple accounts. Embodiments provide security challenges that a user can easily answer without requiring memorization or meticulous organization, as the challenges can be based on recent activities of the user. Further, the security challenges may be easy for the user to answer, but difficult for any other individual to answer.

Figure 11:
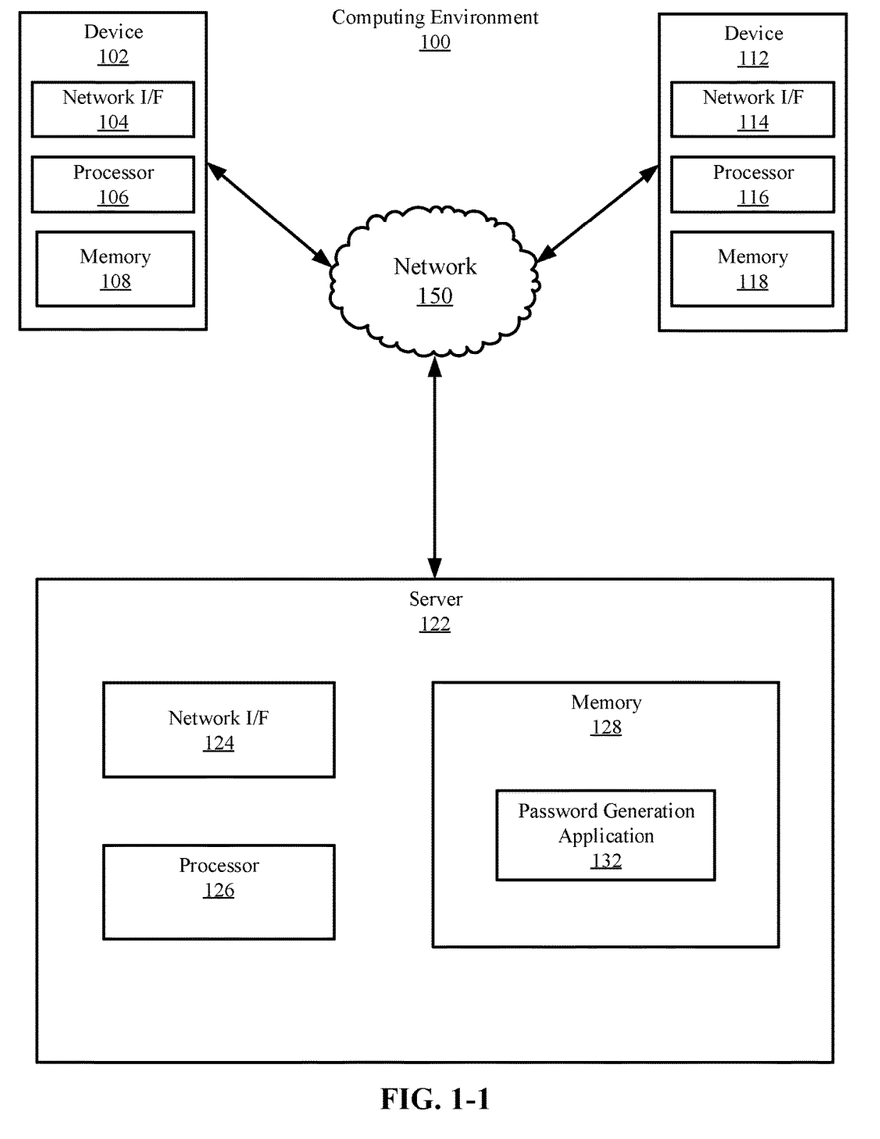

Turning now to the figures, FIG. 1-1 depicts a block diagram of an example computing environment 100 in which illustrative embodiments of the present disclosure may be implemented. In some embodiments, the computing environment 100 may include two devices 102 and 112 and a server 122.

Consistent with various embodiments, the server 122 and the devices 102 and 112 may be computer systems. The devices 102 and 112 and the server 122 may include one or more processors 106, 116, and 126 and one or more memories 108, 118, and 128, respectively. The devices 102 and 112 and the server 122 may be configured to communicate with each other through an internal or external network interface 104, 114, and 124. The network interfaces 104, 114, and 124 may be, in some embodiments, modems or network interface cards. The devices 102 and 112 and/or the server 122 may be equipped with a display or monitor. Additionally, the devices 102 and 112 and/or the server 122 may include optional input devices (e.g., a keyboard, mouse, scanner, video camera, accelerometer, or other input device), and/or any commercially available or custom software (e.g., browser software, communications software, server software, natural language processing software, search engine and/or web crawling software, filter modules for filtering content based upon predefined parameters, etc.). In some embodiments, the devices 102 and 112 and/or the server 122 may be servers, desktops, laptops, or hand-held devices.

The devices 102 and 112 and the server 122 may be distant from each other and communicate over a network 150. In some embodiments, the server 122 may be a central hub from which devices 102 and 112 can establish a communication connection, such as in a client-server networking model. Alternatively, the server 112 and devices 102 and 112 may be configured in any other suitable networking relationship (e.g., in a peer-to-peer (P2P) configuration or using any other network topology).

In some embodiments, the network 150 can be implemented using any number of any suitable communications media. For example, the network 150 may be a wide area network (WAN), a local area network (LAN), an internet, or an intranet. In certain embodiments, the devices 102 and 112 and the server 122 may be local to each other, and communicate via any appropriate local communication medium. For example, the devices 102 and 112 and the server 122 may communicate using a local area network (LAN), one or more hardwire connections, a wireless link or router, or an intranet. In some embodiments, the devices 102 and 112 and the server 122 may be communicatively coupled using a combination of one or more networks and/or one or more local connections. For example, the first device 102 may be hardwired to the server 122 (e.g., connected with an Ethernet cable) while the second device 112 may communicate with the server using the network 150 (e.g., over the Internet).

In some embodiments, the network 150 may be implemented within a cloud computing environment, or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 150.

The server 122 may be configured to generate security challenges and corresponding passwords based on a set of user activity data received from the devices 102 and 112 via a password generation application 132. The password generation application 132 may be configured to obtain the set of user activity data from devices 102 and 112. The user activity data may then be analyzed by the password generation application 132. Specifically, the password generation application 132 may be configured to determine details of the user activity. Details of user activities may include locations, conversations, biometric indications (e.g., heart rate), physical activity (e.g., steps taken), appearance (e.g., clothing and physical attributes), text (e.g., content in emails or social media posts), purchases, surrounding entities, timings, and/or interactions (e.g., physical gestures), to name a few. For example, if the user activity is a lunch meeting with a co-worker, the password generation application 132 may be configured to analyze details of the lunch meeting (e.g., included in the user activity data), including the location of the meeting, the time of the meeting, the items ordered during the meeting (e.g., or alternatively, the items not ordered, by comparing the menu to available receipts), the individuals present at the meeting, the conversations of the meeting, and/or the individuals' satisfaction of the meeting (e.g., via customer feedback data).

In some embodiments, the password generation application 132 can be configured to determine whether the user activity is secure. Determining whether the user activity data is secure may be completed to assess whether the user activity data is suitable to be used as a security challenge. For example, the user activity data may not be suitable to be used as a security challenge if too many entities (e.g., people or AI platforms) have knowledge of the user activity. In some embodiments, the password generation application 132 may generate a security rating for the user activity data, and use the security rating to determine whether the user activity data is secure (e.g., by comparing the security rating to one or more security thresholds).

In some embodiments, the password generation application 132 may be configured to verify the integrity of the user activity data. Verifying the integrity of the user activity data may be completed to ensure the user activity data actually occurred (e.g., was not generated based on fabricated data). For example, if a calendar event is set for location "Z" on Friday, the password generation application 132 may be configured to verify that the individuals invited to the calendar event actually attended the event on Friday (e.g., via global positioning system (GPS) data, financial data, geo-tags, video data, cellular data, and/or application data).

The password generation application 132 may be configured to generate security challenges and passwords based on details included in the user activity data. For example, if user activity data includes details of a conversation between individual "A" and individual "B," and individual "A" discusses his love for cats during that conversation, password generation application 132 may be configured to generate a secure challenge: "What type of animal does individual "A" like?" and a corresponding password "Cats." Additional details relating to the password generation application 132 will be discussed in connection with FIG. 2.

After a security challenge and corresponding password are generated, they may be transmitted to one or more devices, websites, and/or applications (or any other suitable platform) for authentication purposes. This may allow a user to securely log into any account, website, device, etc. The generated security challenges and passwords corresponding to the security challenges may administered as stand-alone passwords or may be integrated into any other suitable authentication method (e.g., multi-factor authentication). That is, in some embodiments, the security challenges and passwords may be administered in addition to existing account passwords (e.g., for an additional validation mechanism or a password-reset option). Alternatively, in some embodiments, the security challenge and corresponding password may be issued as stand-alone authentication challenges to facilitate access to the one or more resources.

While FIG. 1-1 illustrates a computing environment 100 with a single server 122 and two devices 102 and 112, suitable computing environments for implementing embodiments of this disclosure may include any number of devices and servers. The various models, modules, systems, and components illustrated in FIG. 1-1 may exist, if at all, across a plurality of servers and devices. For example, some embodiments may include two servers. The two servers may be communicatively coupled using any suitable communications connection (e.g., using a WAN, a LAN, a wired connection, an intranet, or the Internet).

It is noted that FIG. 1-1 is intended to depict the representative major components of an exemplary computing environment 100. In some embodiments, however, individual components may have greater or lesser complexity than as represented in FIG. 1-1, components other than or in addition to those shown in FIG. 1-1 may be present, and the number, type, and configuration of such components may vary.

Figure 12:
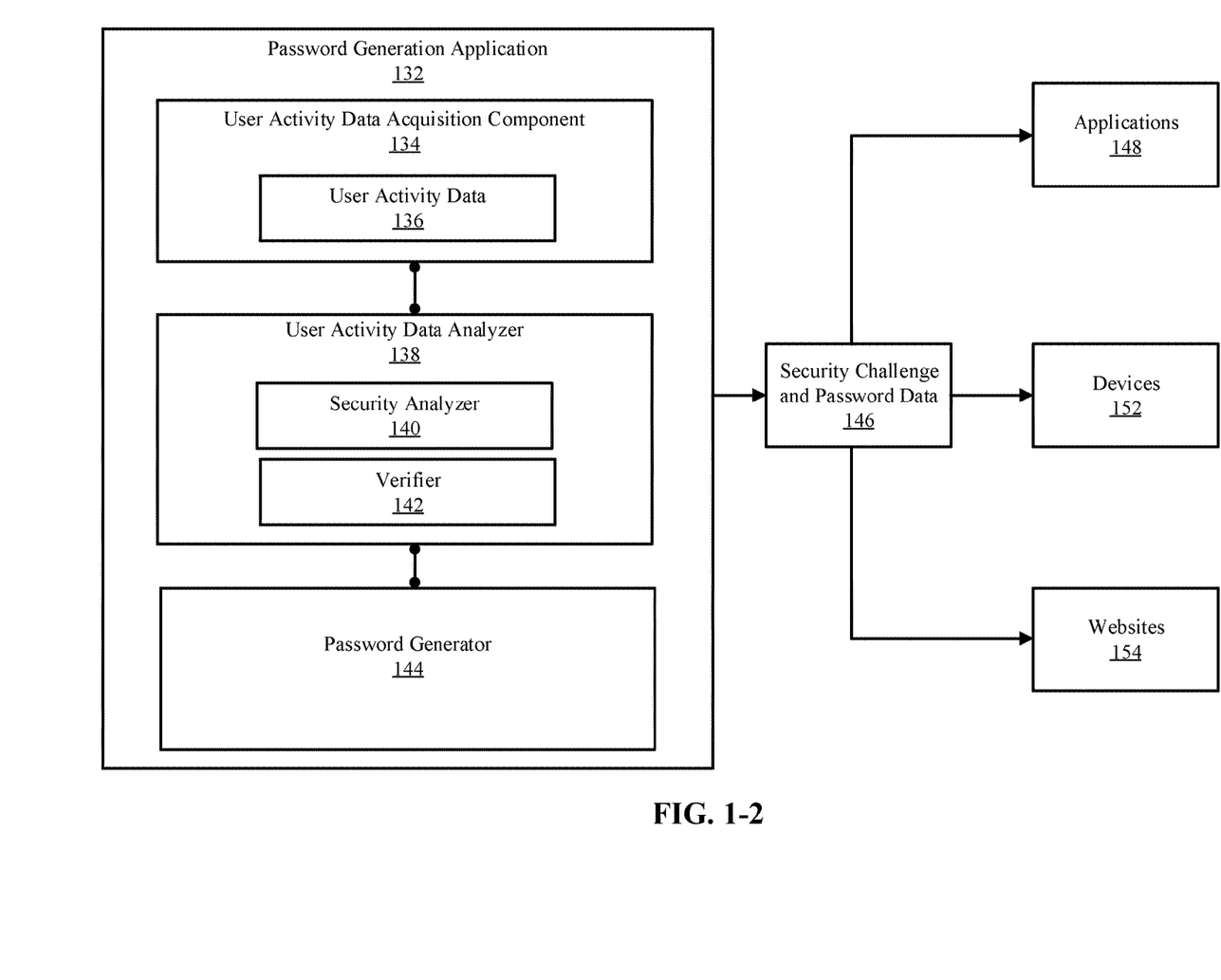

Referring now to FIG. 1-2, shown is a block diagram of password generation application 132 communicatively coupled to one or more applications 148, devices 152, and websites 154, in accordance with embodiments of the present disclosure. As referenced in FIG. 1-2, devices 152 may be the same or substantially the same as device 102 and device 112 described in FIG. 1-1. Further, in some embodiments applications 148 and/or websites 154 may be included in or accessed from devices 102, 112, and 152.

The password generation application 132 may include a user activity data acquisition component 134, to obtain user activity data 136 from one or more data sources. The user activity data 136 may be obtained by the user activity data acquisition component 134 in any manner. In some embodiments, the user activity data acquisition component 134 may request user activity data 136 from the one or more data sources (e.g., using pull techniques). In some embodiments, the user activity data acquisition component 134 may receive user activity data 136 as pushed by the one or more data sources. In some embodiments, user activity data 136 may be received over a network (e.g., network 150 in FIG. 1). However, any suitable communication between the user activity data acquisition component 134 and the one or more data sources is contemplated (e.g., see FIG. 1-1).

The user activity data 136 may be obtained from any suitable source. Sources user activity data 136 may be received from include smart wear (e.g., smart watches, smart glasses), websites (e.g., social media and blogs), accounts (e.g., user and email accounts), digital calendars/event planners, applications (e.g., nutrition, fitness, and transportation applications), cellular data (e.g., text messages and phone calls), video recording devices (e.g., security cameras), wireless devices (e.g. a smart phone communicatively coupled to a treadmill), conversational devices, and/or financial data sources (e.g., credit card data and purchasing information), to name a few. In some embodiments, devices 102 and 112 (see FIG. 1) may be or include one or more of the aforementioned sources, and may transmit the user activity data 136 to the password generation application 132 over a network (e.g., network 150).

The password generation application 132 can further include a user activity data analyzer 138, which may be configured to analyze the user activity data 136. The user activity data analyzer 138 may analyze various details of the user activity data 136. For example, the user activity data analyzer 138 may analyze locations, conversations, biometric indications (e.g., heart rate), physical activity (e.g., steps taken), appearance (e.g., clothing and physical attributes), text (e.g., content in emails or social media posts), purchases, surrounding entities, timings, and/or interactions (e.g., physical gestures) associated with the user activity data 136. In some embodiments, the user activity data analyzer 138 may compile all of the details corresponding to the user activity data 136 in memory. For example, the user activity data analyzer 138 may compile a table of all details corresponding to a user activity.

In some embodiments, the user activity data analyzer 138 may include a security analyzer 140, which may determine whether the user activity data 136 is secure. Determining whether the user activity data 136 is secure may be completed in any suitable manner. For example, the security analyzer 140 may generate a security rating for the user activity data 136, and use the security rating to determine whether the user activity data 136 is secure. In some embodiments, the security rating may be compared to a security threshold, and if the security rating satisfies the security threshold, the user activity data may be determined to be secure. If the security analyzer determines the user activity data 136 is not secure, the user activity data 136 may not be used to generate a security challenge or corresponding password.

The security rating may be based on details included in the user activity data 136. For example, in some embodiments, the security rating may be based on a number of entities with knowledge of the user activity data 136. This may be completed to ensure that the security challenge and corresponding password are unknown to third parties and/or entities. For example, if the user activity data analyzer 138 determines that five entities have knowledge of the user activity data, the security analyzer 140 may define the security rating as five. In this example, the security analyzer 140 may define an upper limit security threshold of three individuals. Accordingly, because the security rating of five exceeds the security threshold of three, the security analyzer 140 may determine that the user activity data 136 is not secure. Though the number of entities with knowledge of the user activity data 136 may be used to define security ratings and security thresholds, any other details included in the user activity data 136 can be used to define security ratings and security thresholds. For example, the security analyze 140 may utilize locations, network paths, data sources and temporal periods for security rating and security threshold determinations.

In some embodiments, the security rating may only satisfy the security threshold if multiple security challenges (e.g., presented in a single authentication protocol) are collectively unknown to $3^{rd}$ parties. For example, Alan is presented with a password challenge. Let's consider a few events: Alan, Alice and Bob were at a dinner event. Everything that happened during the dinner event is known to Alan, Alice and Bob, and therefore, the dinner event may not be secure (e.g., based on the number of entities with knowledge of the dinner event). Another event may be considered for security challenge and password generation, where Alan, Alice and Kyle went to the gym. Using the gym event and dinner event as a security challenge may improve security, but may not completely eliminate security risk, because Alice knows about both events (one additional individual knows about each event). Let's consider a third event where Alan and Kyle went to the mall. Collectively using the dinner event, gym event, and mall event as a security challenge may be the most secure because no third party (except for Alan) has knowledge about all three events. Notice that any one of these three events may not provide sufficient security (e.g., based on a number of entities with knowledge of the user activity data 136). However, collectively generating a security challenge implementing all three events may satisfy the security threshold.

In some embodiments, the security rating may be based on a temporal period. For example, in some embodiments, the security rating may be proportional to the recency of an event (e.g., a meeting) indicated in the user activity data 136. In this example, if two events included in the user activity data 136 occurred one day ago and one week ago, respectively, the event that occurred one day ago may have a higher security rating (e.g., and may be more secure). Security rating may be directly proportional to the recency of the events, as there may be less time for a malicious party to determine details of the event. Further, recent user activities may be easier for an individual to remember, and thus be better suited for security challenge generation.

In some embodiments, the security rating may be based on a number of sources the user activity data 136 is received from. For example, if a set of five security challenges and passwords are to be generated (e.g., a user must answer five security challenges before access is permitted), security analyzer 140 may consider the number of sources the user activity data 136 was received from for security purposes. For example, the security analyzer may define a lower limit security threshold of three sources. Accordingly, if two sources or less provide the user activity data 136 corresponding to the five security challenges, the security analyzer 140 may determine that the user activity data 136 is not suitable for security challenge and password generation.

Generating security challenges based on the number of sources the user activity data 136 was received from may increase security, as if the user activity data 136 is received from multiple sources, the probability that a malicious party (e.g., hacker) can intercept the user activity data 136 can be decreased. For example, if the user activity data 136 corresponding to the five security challenges is received from a smart phone, the hacker may only need to intercept the user activity data 136 from the smart phone. On the other hand, if the user activity data 136 corresponding to the five security challenges is received from a smart phone, a desktop, a security camera, a conversational device, and a smart vehicle, the hacker may need to intercept portions of the user activity data 136 from each of the five sources in order to be able to answer the five security challenges.

Though example security ratings and security thresholds are based on an integer number scale, it is to be understood that any other mathematical substitute to determining and comparing security ratings and security thresholds may be implemented (e.g. implementing any rational or irrational number values). Further, any suitable statistical analysis for determining security ratings and/or security thresholds may be implemented. Security ratings may be arbitrarily defined values to determine how secure the user activity data 136 is. In some embodiments, a higher security rating may indicate a lower user activity data 136 security (e.g., if the number of sources the user activity data 136 was received from is used to determine the security rating). In some embodiments, a lower security rating may indicate a higher user activity data 136 security (e.g., if the number of entities with knowledge of the user activity data 136 is used to determine the security rating).

Further, though a single security threshold having two conditions (e.g., secure vs. not secure) may be implemented, in some embodiments, multiple security thresholds may be defined (e.g., having n+1 conditions, where n is the number of security thresholds). For example, in some embodiments, there may be two security thresholds. The two security thresholds may have three corresponding conditions (e.g., secure, flagged as potentially not secure, and not secure). In this example, if the user activity data analyzer 138 determines that four entities have knowledge of the user activity data 136, the security analyzer 140 may define a security rating of four. If the security analyzer defines two upper limit thresholds of three and five, the security rating of four may exceed the security threshold of three, but satisfy the security threshold of five. Accordingly, the security analyzer 140 may determine that the user activity data 136 is potentially not secure, and may flag the user activity data 136.

In some embodiments, the security analyzer 140 may consider the amount of user activity data 136 received to determine whether flagged (e.g., or other intermediate risk) security ratings can be used for password generation. For example, if the user activity data 136 only includes details for one specific user activity in the last month, the security analyzer 140 may determine that flagged user activity data 136 can be used for security challenge and password generation.

In some embodiments, the password generation application 132 may include a verifier 142. The verifier 142 may verify the occurrence of the activities included in the user activity data 136. For example, if a social media post indicated a tail gating event, and ten individuals accepted the event invitation, the verifier 142 may cross-reference GPS, geo-tags, text messages, applications, or other sources to determine whether those ten individuals actually attended the tail gating event. Verification may be beneficial to ensure a security challenge and password can be accurately defined for the user activity data 136. Further, verification may prevent fabricated user activity data 136 from malicious parties being used for security challenge generation.

In some embodiments, the verifier 142 may be configured to obtain a verification location and timing, and compare the verification location and timing to a location and timing included in the user activity data 136. For example, in some embodiments, the verifier 142 may compare a GPS timing and location to a timing and location included in the user activity data 136 to determine whether the user activity data 136 is verified for security challenge generation. As another example, the verifier 142 may compare a location and timing associated with a set of video data to a location and timing included in the user activity data 136 to determine whether the user activity data 136 is verified for security challenge generation.

The password generator 144 may generate security challenge and password data 146 according to details of the user activity data 136 reported by the user activity data analyzer 138. In some embodiments, the security challenge and password data 146 may only be generated if the user activity data 136 is approved by the security analyzer 140 and verifier 142 for password generation. The security challenge and password data 146 can reflect details of the user activity data 136, including locations, conversations, biometric indications (e.g., heart rate), physical activity (e.g., steps taken), appearance (e.g., clothing and physical attributes), text (e.g., content in emails or social media posts), purchases, surrounding entities, timings, and/or interactions (e.g., physical gestures). For example, if user activity data 136 is received from text messages, and the details of the text messages include a specific location for the meeting, the password generator 144 can generate a security challenge and corresponding password according to content of the message (e.g., Security Challenge: "What room was your meeting located in today?" Password: "Room 102B"). As another example, if user activity data 136 is received from a security camera, and the details of the recording include apparel a user was wearing, the password generator 144 can generate a security challenge and corresponding password according to the detected apparel (e.g., Security Challenge: "What type of footwear were you wearing today?" Password: "Sandals").

In some embodiments, multiple passwords (e.g., acceptable responses) can correspond to a single security challenge. For example, if a security challenge is: "What type of footwear were you wearing today?" acceptable passwords may include: "Sandals," "Flip-Flops," "Slides," and "Slip-Ons." As another example, if a security challenge is: "What did you wear today?" acceptable passwords may include: "A red shirt and gray pants" or "A button down shirt with gabardine pleated pants." Further, in some embodiments, there may be error allowances for passwords to security challenge. For example, password generator 144 may allow a certain number of characters to vary from the actual defined password (e.g., for a set password "Gray," "Grey" may be a permitted answer). Further, in some embodiments, portions of a defined password may be accepted (e.g., for a set password "Blue-Green," "Green" or "Blue" may be acceptable answers). In some embodiments, there may not be a correct answer to the security challenge, and "nothing" may be an acceptable answer.

In some embodiments, password generator 144 may generate a set of passwords based on the user activity data 136 to be included in the security challenge and password data 146. In some embodiments, the password generator 144 may generate the set of passwords for respective activities. For example, the password generator 144 may generate a set of three security challenges and passwords corresponding to three respective user activities (e.g., a meeting, a golf outing, and a dinner date). In this example, security challenges and corresponding passwords may include: Security Challenge "How long was your meeting?" Answer: "45 Minutes," Security Challenge: "What was your final score in the golf outing today?" Answer: "80," Security Challenge: "What did you have for dinner tonight?" Answer: "Steak." In some embodiments, password generator 144 may generate a set of passwords for the same user activity. For example, the password generator 144 may generate three passwords all corresponding to a golf outing. In this example, security challenges and corresponding passwords may include: Security Challenge: "What holes did you par today?" Answer: "Two, Eight, and Fifteen," Security Challenge: "Who was your golf cart partner?" Answer: "Bob," Security Challenge: "What was your farthest drive today?" Answer: "300 yards." However, any number of security challenges corresponding to respective user activities may be generated. Further, any number of user activities can be used for security challenge generation.

In some embodiments, follow-up security challenges may be generated in response to a password attempt. For example, if a security challenge includes: "What did you have for dinner?" and an individual correctly answered "Steak," the password generator 144 may issue a follow-up question "How was your steak cooked?" In this regard, in some embodiments, the password generation application 132 may be interactive, and may generate additional security challenges and corresponding passwords in response to password attempts (e.g., including incorrect and correct responses).

After the security challenge and password data 146 is generated, the password generation application 132 may transmit the security challenge and password data 146 to one or more destinations to be used as a security measure. For example, the password generation application 132 can transmit the security challenge and password data 146 to one or more applications 148, devices 152, and/or websites 154. The security challenge and password data 146 may then be used as login authentication for various applications 148 (e.g., transportation applications, fitness applications, gaming applications, etc.), devices 152 (e.g., smart wear, smart phones, vehicles, user desktops, servers, etc.), and websites 154 (e.g., social media, blogs, email accounts, etc.). The password generation application 132 may transmit the security challenge and password data 146 in any manner. In some embodiments, the password generation application 132 may transmit the security challenge and password data 146 over a network (e.g., network 150 of FIG. 1-1).

Reference may now be made to various examples in which embodiments of the present disclosure may be implemented. The various examples are not to be construed as limiting.

In some embodiments, the user activity data acquisition component 134 obtains the set of user activity data 136 from a video source. Video source examples can include live streaming video cameras, security cameras, and/or application video data. The user activity data analyzer 138 may then analyze various details of the video data obtained from the video source. For example, the user activity data analyzer 138 may analyze the appearance (e.g., apparel), activities (e.g., running, walking, sleeping, jumping), and physical gestures (e.g., hand motions) associated with an individual. Further, the user activity data analyzer 138 may analyze the number of individuals, time, and location associated with the video data. The password generator 144 may then be configured to generate one or more security challenges and corresponding passwords based on the video data.

In some embodiments, the user activity data acquisition component 134 may obtain the set of user activity data 136 from a conversational device. Conversational devices may process natural language queries as generated by an individual, and provide responses and execute actions based on the processed language. Accordingly, in some embodiments, the user activity data acquisition component 134 may obtain a set of conversational data corresponding to the natural language processed by the conversational device. The user activity data analyzer 138 may then analyze various details of the conversational data. For example, the user activity data analyzer 138 may analyze questions asked by an individual (e.g., "Who was the first president?"), responses given by the conversational device (e.g., "George Washington."), demands issued by the individual (e.g., "Play Stairway to Heaven"), and actions issued by the conversational device (e.g., "Playing Stairway to Heaven, by Led Zeppelin"). The password generator 144 may then be configured to generate one or more security challenges and corresponding passwords based on the conversational data.

In some embodiments, the user activity data acquisition component 134 may obtain the set of user activity data 136 from a cellular data source (e.g., smart phones, cellular data companies). The cellular data source may include cellular data such as text messages, phone calls, browsing histories, and media libraries, to name a few. The user activity data analyzer 138 may then analyze various details of the cellular data. For example, the user activity data analyzer 138 may analyze text messages, phone calls, pictures, videos, and internet history associated with an individual's cellular data. The password generator 144 may then be configured to generate one or more security challenges and corresponding passwords based on the cellular data.

In some embodiments, the user activity data acquisition component 134 may obtain the set of user activity data 136 from a financial data source (e.g., a bank or credit company). The financial data source may include purchasing data such as previous purchases, purchase amounts, transactions, purchase locations, and purchase timings associated with an individual. The user activity data analyzer 138 may then analyze various details of the purchasing data. For example, the user activity data analyzer 138 may analyze recent purchases (e.g., 10 gallons of gasoline), purchase amounts (e.g., $28 dollars for the 10 gallons of gasoline), transactions (e.g., a $200 dollar withdrawal), purchase locations (e.g., Gas Station located on $1^{st}$ Avenue), and purchase timings (e.g., the gas was purchased at 12:00 PM) associated with an individual. The password generator 144 may then be configured to generate one or more security challenges and corresponding passwords based on the purchasing data.

In some embodiments, the user activity data acquisition component 134 may obtain the set of user activity data 136 from an application data source (e.g., a fitness application or nutrition application). The application data source may include data associated with the application (e.g., a workout schedule for a fitness application or a meal plan for a nutrition application). The user activity data analyzer 138 may then analyze various details of the application data. For example, if the user activity data 136 includes fitness data obtained from a fitness application, the user activity data analyzer 138 may analyze weight, height, heart rate, running speed, steps taken, and workouts completed associated with an individual. As another example, if the user activity data 136 includes nutrition data obtained from a nutrition application, the user activity data analyzer 138 may analyze the food and beverages consumed by an individual. The password generator 144 may then be configured to generate one or more security challenges and corresponding passwords based on the application data. Though fitness and nutrition applications were discussed as example application data sources, user activity data acquisition component 134 may obtain user activity data 136 from any other application data source, including transportation applications, financial applications, gaming applications, and social media applications, to name a few.

It is noted that FIG. 1-2 is intended to depict the representative major components of the password generation application 132. In some embodiments, however, individual components may have greater or lesser complexity than as represented in FIG. 1-2, components other than or in addition to those shown in FIG. 1-2 may be present, and the number, type, and configuration of such components may vary. For example, in some embodiments, password generation application 132 may not include a verifier 142. Further, in some embodiments, security challenge and password data 146 can be transmitted over a network.

Figure 2:
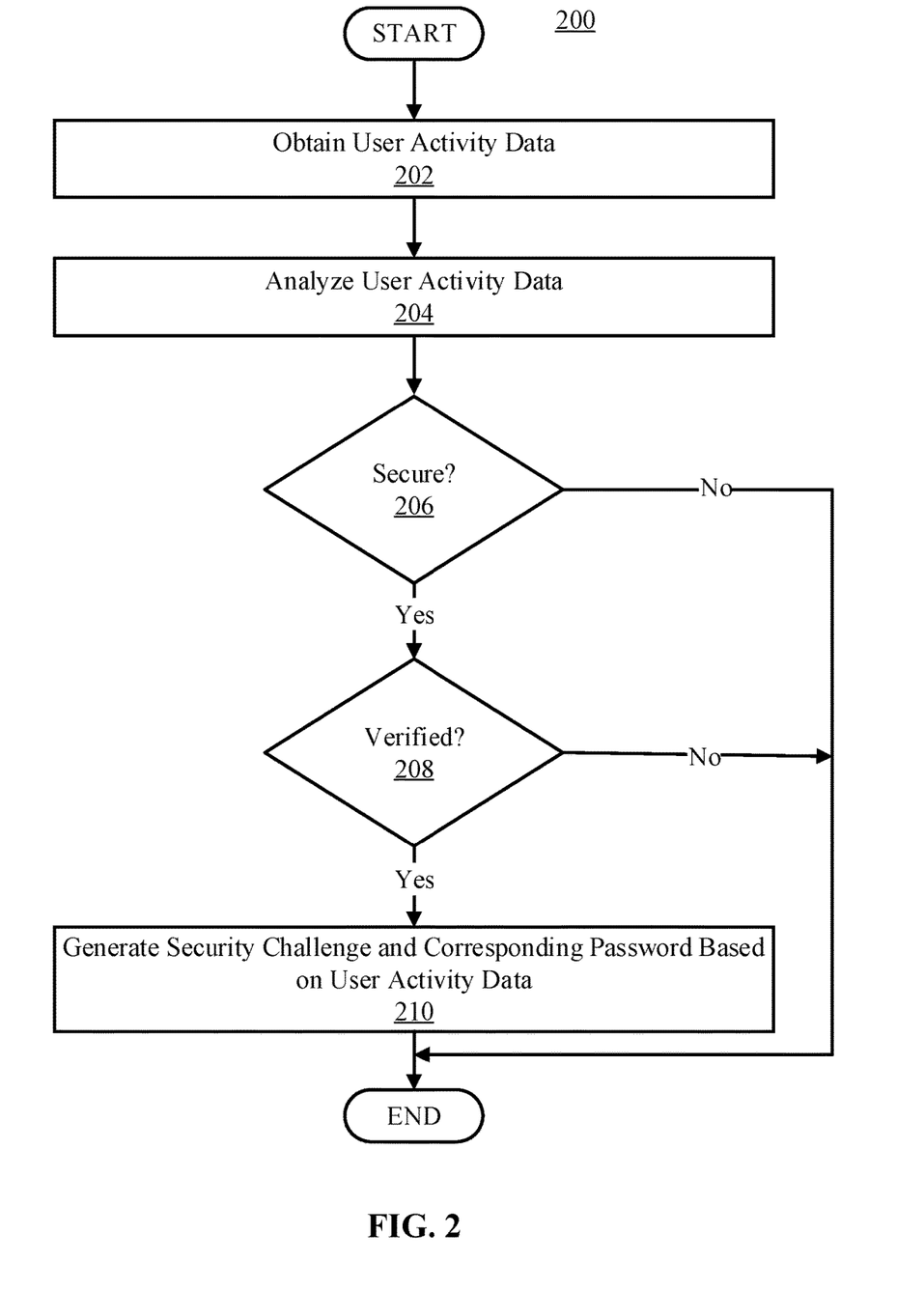
FIG. 2 illustrates a flow diagram of an example method for generating a security challenge and password, in accordance with embodiments of the present disclosure

Referring now to FIG. 2, shown is a flow diagram of an example method 200 for generating a security challenge and corresponding password based on user activity data, in accordance with embodiments of the present disclosure. As referenced in FIG. 2, user activity data may be the same or substantially the same as user activity data 136 as described in FIG. 1-2.

Method 200 starts by obtaining user activity data. This is illustrated at operation 202. User activity data can be obtained in any suitable manner. In some embodiments, user activity data may be obtained as requested (e.g., using pull techniques). In some embodiments, user activity data may be obtained as received by one or more data sources (e.g., as pushed by the one or more sources). The user activity data may be obtained from any data source, including applications, websites, and/or devices. For example, a phone application may push user activity data, including GPS positions, application usage, calls and texts to the password generation application. Further, user activity data may be obtained from any number of data sources.

After user activity data is obtained at operation 202, the user activity data is analyzed at operation 204. Analysis at operation 204 may include analyzing various details of the user activity data, including locations, timings, conversations, text, surrounding entities, biometric indicators, financial data and/or appearance, to name a few. Further, analysis at operation 204 may include determining the source(s) the user activity data was received from. The analysis of the user activity data may be stored in the memory. In some embodiments, details corresponding to respective user activities may be compiled. For example, if a user activity is a marathon, all of the data corresponding to the marathon may be stored in a table. The analysis of the user activity data may, in some embodiments, be used to determine whether the user security data is secure and/or verified (see operations 206-210).

At operation 206, the user activity data is analyzed to determine whether it is secure. Determining whether the user activity data is secure may be based on analysis of the user activity data performed at operation 204. For example, in some embodiments, determining whether the user activity data is secure may be based on the number of surrounding entities with knowledge of the user activity data and/or the number of sources the user activity data was received from. In some embodiments, a security rating may be generated for the user activity data and be compared to a security threshold to determine whether the user activity data is secure. If the user activity data is determined to be secure at operation 206, method 200 may proceed to operation 208, where the user activity data may be verified. If the user activity data is determined to be not secure, method 200 may end, as the user activity data may not be suitable for security challenge and password generation.

At operation 208, the user activity data may be verified. Verifying the user activity data may be completed in any manner. In some embodiments, verifying may include comparing details of the user activity data to geo-tags, GPS, application data, financial data, and/or video data. Verification may be beneficial to ensure the security challenge and password can be accurately defined for the user activity data. Further, verification may prevent fabricated data generated by malicious parties from being used in security challenges. If the user activity data is verified at operation 208, method 200 may move to operation 210, where security data (e.g., a security challenge and corresponding password) may be generated based on the user activity data. If the user activity data is not verified at operation 208, method 200 may end.

At operation 210 a security challenge and/or corresponding password is generated based on the user activity data. In some embodiments, the security challenge may be based on one or more of the details included in the user activity analysis performed at operation 204. For example, security challenges may be generated based on locations, timings, conversations, text, surrounding entities, biometric indicators, financial data and/or appearance. In some embodiments, a set of security challenges and corresponding passwords may be generated based on the user activity data. However, any suitable number and/or type of security challenges and passwords otherwise consistent herein is contemplated. After the security challenge and corresponding password is generated, they may be transmitted to one or more devices, applications and/or websites to be used for authentication (e.g., see FIG. 3).

In some embodiments, operation 208 can occur prior to, or at the same time, as operation 206. In some embodiments, operations 206 and 208 may be completed at the same time as operation 204.

Figure 3:
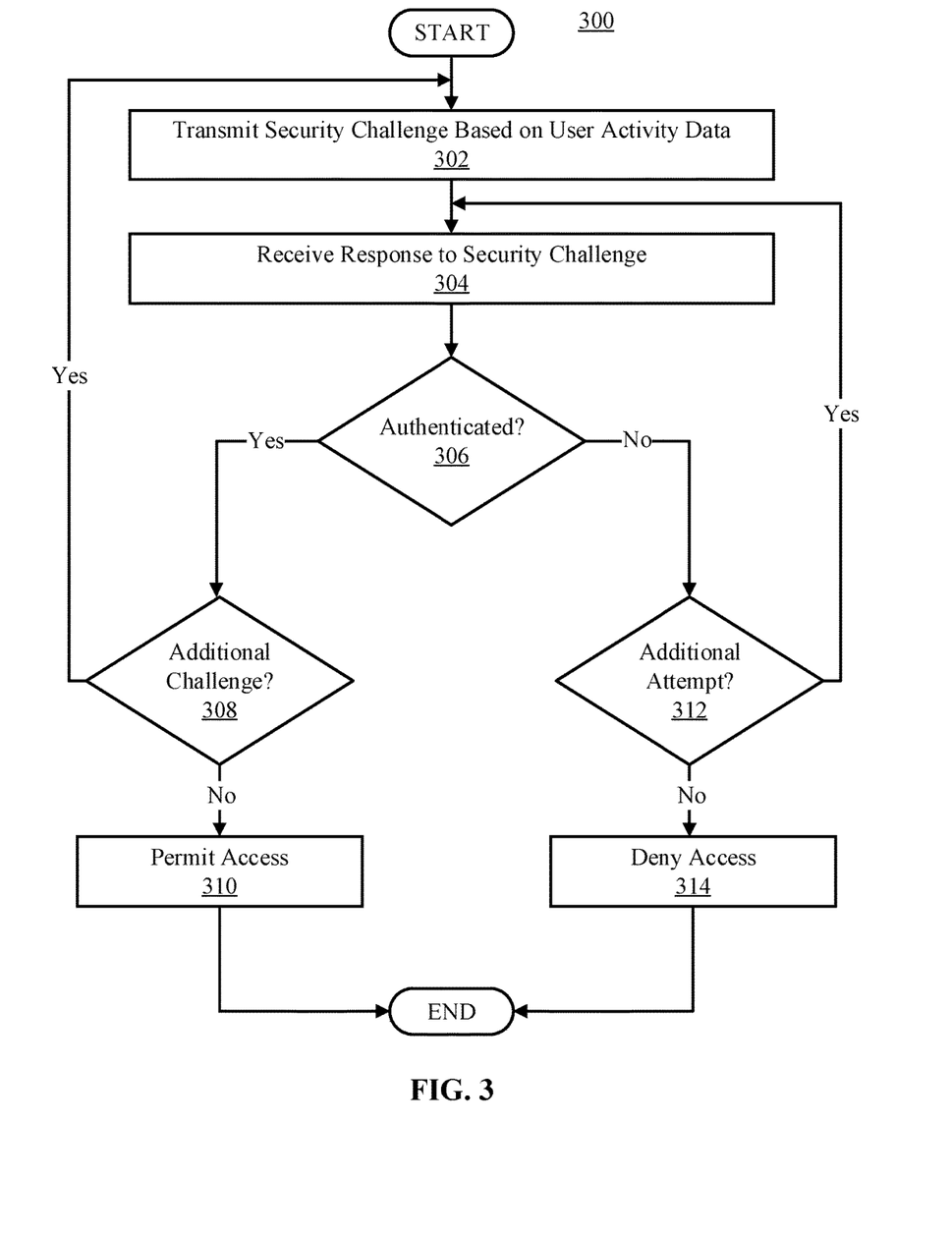
FIG. 3 illustrates a flow diagram of an example method for authenticating a user, in accordance with embodiments of the present disclosure.

Referring now to FIG. 3, shown is a flow diagram of an example method 300 for authenticating a user, in accordance with embodiments of the present disclosure. As referenced in FIG. 3, the user activity data and security challenge and password may be the same or substantially the same as the user activity data 136 and security challenge and password data 146 as described in FIG. 1-2, respectively.

Method 300 begins by transmitting a security challenge based on user activity data to one or more destinations. This is illustrated at operation 302. The destinations the security challenge can be transmitted to may be substantially the same destinations as described in FIG. 1-2. For example, destinations the security challenge may be transmitted to include applications, devices, and/or websites (e.g., applications 148, devices 152, and websites 154). Further, the security challenge may be transmitted in any manner. For example, the security challenge may be transmitted over a network (e.g., network 150 from FIG. 1). In some embodiments, both the security challenge and password may be transmitted, and the destination (e.g., smart phone) may compare the response received from the user to the password (e.g., the correct response) corresponding to the security challenge. In some embodiments, only the security challenge may be transmitted, and the response to the security challenge may be returned (e.g., to the computer system that transmitted the security challenge) and cross-referenced with the password (e.g., as shown in FIG. 3). In some embodiments, multiple security challenges and corresponding passwords may be simultaneously transmitted.

At operation 304, a response to the security challenge is received. After the response is received, it can be compared to a password corresponding to the security challenge to determine whether the user is authenticated at operation 306. For example, in some embodiments, the response may be compared to a list of acceptable passwords. In some embodiments, the list of acceptable passwords may include an error allowance (e.g., the response may be allowed if it substantially corresponds to a password on the list of acceptable passwords). In some embodiments, the password corresponding to the security challenge may be hashed (e.g., processed through a cryptographic hash function), and authenticating may include generating a hash value for the user response, and comparing the hash value to the hashed password. If the user is authenticated at operation 306, method 300 may proceed to operation 308, where a determination may be made to issue additional security challenges. If the user is not authenticated at operation 306, method 300 may proceed to operation 312, where a determination is made to allow additional attempts.

At operation 308, a determination is made whether to issue additional security challenges. In some embodiments, additional security challenges may be issued in response to suspicious activity. For example, if the user responds incorrectly multiple times, but eventually responds correctly, additional security challenges may be issued. In some embodiments, additional security challenges may always be issued (e.g., a computer system may be configured to transmit three security challenges each time). In some embodiments, additional security challenges may not be issued. For example, in some embodiments, transmitting the security challenge at operation 302 may include simultaneously transmitting a set of security challenges (e.g., five security challenges). If a determination is made that additional security challenges are to be issued, method 300 may move back to operation 302, where the additional security challenges are transmitted. If a determination is made that additional security challenges are not to be issued, then method 300 may proceed to operation 310, where access is permitted. Permitting access may include transmitting a notification to the user that the response was correct (e.g., "Correct, enjoy your day."). After access is permitted, method 300 may end.

At operation 312, a determination is made whether to allow additional response attempts to the security challenges. In some embodiments, the number of additional attempts may be fixed (e.g., five attempts for each challenge). In some embodiments, the number of attempts may depend on how close the response was to the password (e.g., the response varied a few characters from the password). In some embodiments, additional attempts may be limited based on the user activity data. For example, if the user activity was recent (e.g., within an hour), only a few additional attempts may be permitted. If a determination is made that additional attempts are allowed, operation 312 may move back to operation 304, where a response to the security challenge is received. If a determination is made that additional attempts are not allowed, then access may be denied at operation 314. Denying access may include permanently or temporarily denying access to the user. For example, if the user responded incorrectly five consecutive attempts, the user may be locked-out for one hour before additional attempts are permitted. On the other hand, in some embodiments, access may be permanently denied. If access is denied, in some embodiments, a new security challenge may be generated and transmitted to the user at a later time.

The aforementioned operations may be completed in any order and are not limited to those described. Additionally, some, all, or none of the aforementioned operations may be completed, while still remaining within the spirit and scope of the present invention. For example, in some embodiments, operation 308 may not be completed, as a set of security challenges may be simultaneously issued. In some embodiments, operation 312 may be not completed, as additional attempts may not be permitted.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
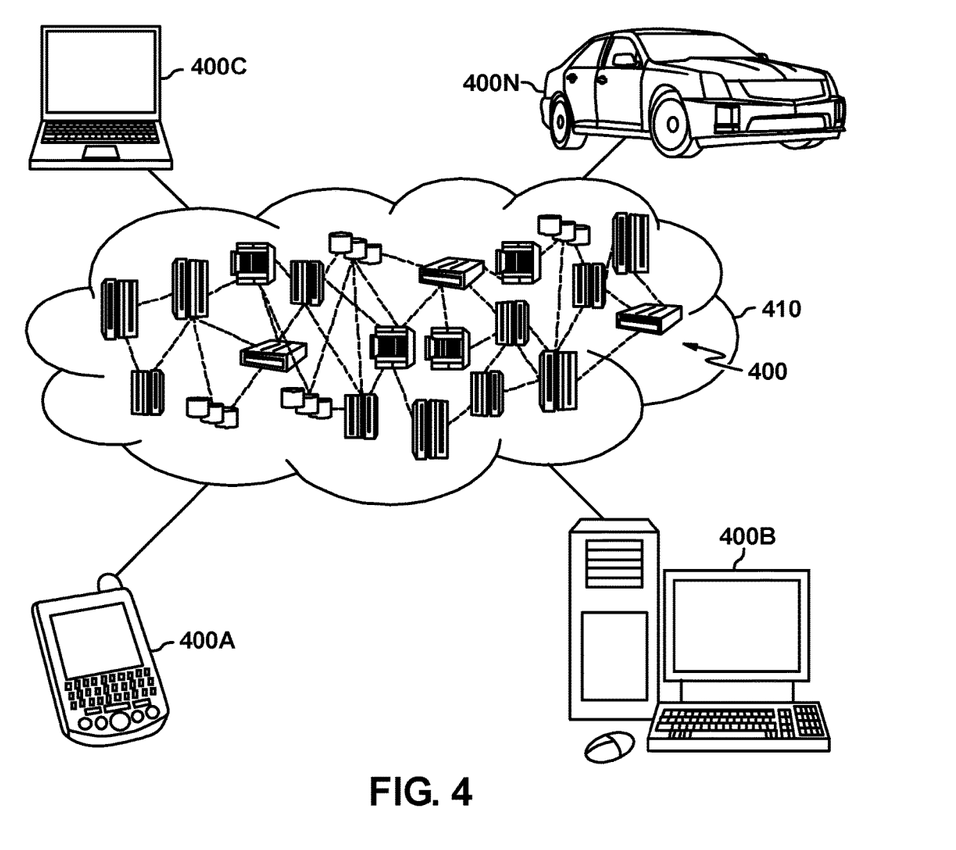
FIG. 4 illustrates a cloud computing environment, in accordance with embodiments of the present disclosure.

Referring now to FIG. 4, illustrative cloud computing environment 410 is depicted. As shown, cloud computing environment 410 includes one or more cloud computing nodes 400 with which local computing devices used by cloud consumers, such as, for example, personal digital assistant (PDA) or cellular telephone 400A (e.g., devices 102/112 and devices 152), desktop computer 400B (e.g., devices 102/112, server 122, devices 152) laptop computer 400C (e.g., devices 102/112, server 122, devices 152), and/or automobile computer system 400N (e.g., devices 102/112 and devices 152) may communicate. Nodes 400 may communicate with one another. They may be grouped (not shown) physically or virtually, in one or more networks, such as Private, Community, Public, or Hybrid clouds as described hereinabove, or a combination thereof. This allows cloud computing environment 410 to offer infrastructure, platforms and/or software as services for which a cloud consumer does not need to maintain resources on a local computing device. It is understood that the types of computing devices 400A-N shown in FIG. 4 are intended to be illustrative only and that computing nodes 400 and cloud computing environment 410 can communicate with any type of computerized device over any type of network and/or network addressable connection (e.g., using a web browser).

Figure 5:
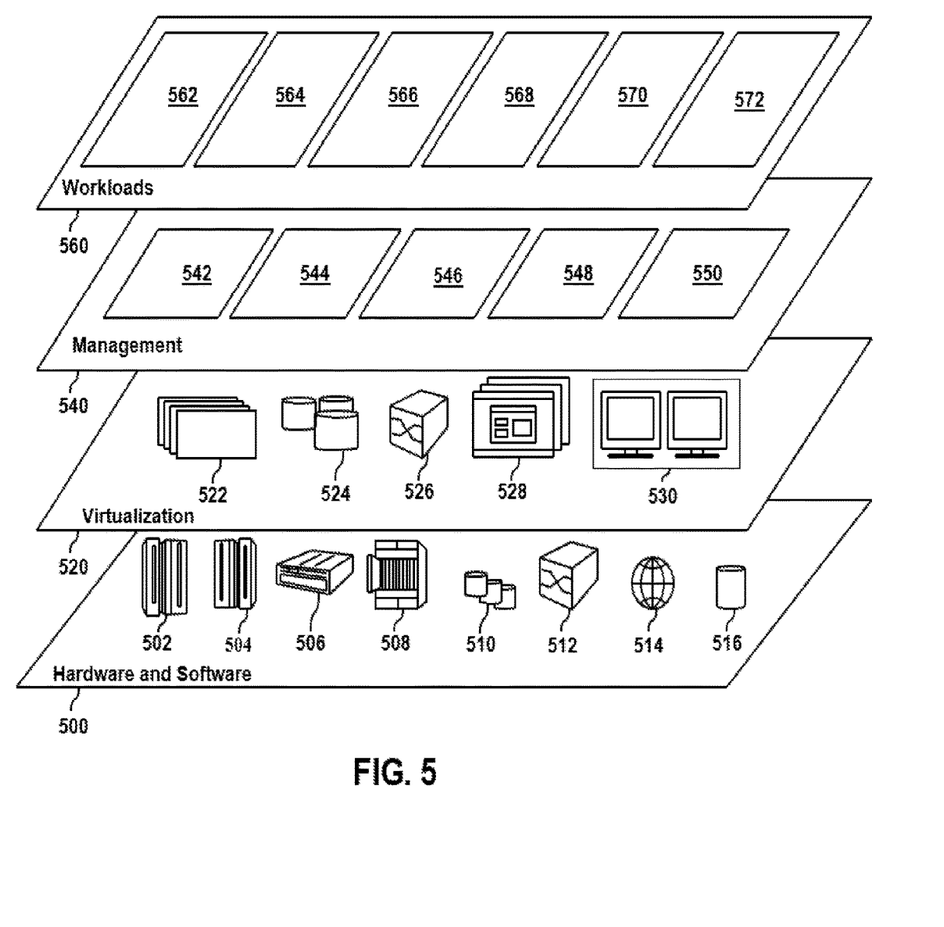
FIG. 5 illustrates abstraction model layers, in accordance with embodiments of the present disclosure.

Referring now to FIG. 5, a set of functional abstraction layers provided by cloud computing environment 410 (FIG. 4) is shown. It should be understood in advance that the components, layers, and functions shown in FIG. 5 are intended to be illustrative only and embodiments of the invention are not limited thereto. As depicted below, the following layers and corresponding functions are provided.

Hardware and software layer 500 includes hardware and software components. Examples of hardware components include: mainframes 502; RISC (Reduced Instruction Set Computer) architecture based servers 504; servers 506; blade servers 508; storage devices 510; and networks and networking components 512. In some embodiments, software components include network application server software 514 and database software 516.

Virtualization layer 520 provides an abstraction layer from which the following examples of virtual entities may be provided: virtual servers 522; virtual storage 524; virtual networks 526, including virtual private networks; virtual applications and operating systems 528; and virtual clients 530.

In one example, management layer 540 may provide the functions described below. Resource provisioning 542 provides dynamic procurement of computing resources and other resources that are utilized to perform tasks within the cloud computing environment. For example, resource provisioning 542 may obtain a suitable number of processing devices to process user activity data. Metering and Pricing 544 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 546 provides access to the cloud computing environment for consumers and system administrators. Service level management 548 provides cloud computing resource allocation and management such that required service levels are met. Service level management 548 may allocate suitable processing power and memory to process static sensor data. Service Level Agreement (SLA) planning and fulfillment 550 provide pre-arrangement for, and procurement of, cloud computing resources for which a future requirement is anticipated in accordance with an SLA.

Workloads layer 560 provides examples of functionality for which the cloud computing environment may be utilized. Examples of workloads and functions which may be provided from this layer include: mapping and navigation 562; software development and lifecycle management 564; virtual classroom education delivery 566; data analytics processing 568; transaction processing 570; and identifying an identifiable media 572.

Figure 6:
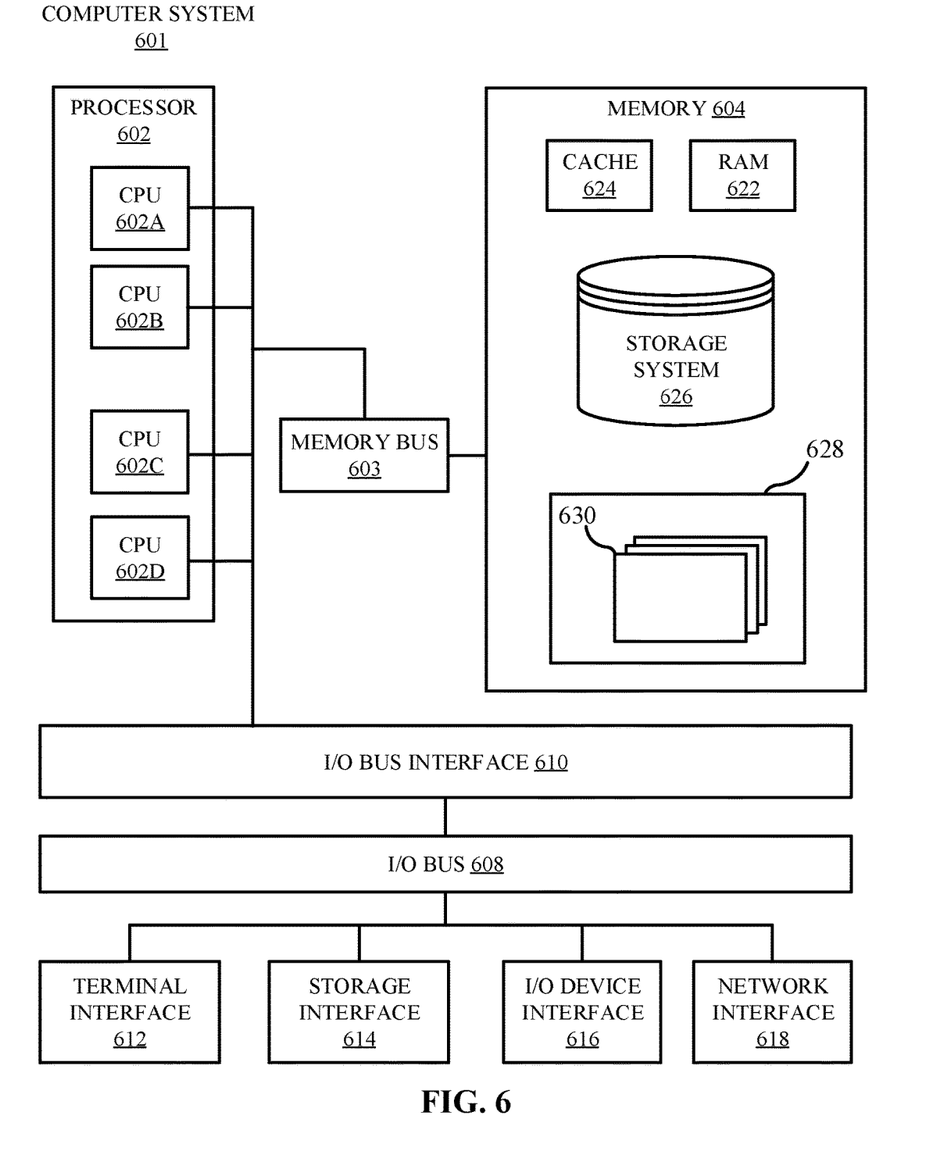
FIG. 6 illustrates a high-level block diagram of an example computer system that may be used in implementing one or more of the methods, tools, and modules, and any related functions, described herein, in accordance with embodiments of the present disclosure.

Referring now to FIG. 6, shown is a high-level block diagram of an example computer system 601 (e.g., devices 102/112, server 122, and devices 150) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 601 may comprise one or more CPUs 602, a memory subsystem 604, a terminal interface 612, a storage interface 616, an I/O (Input/Output) device interface 614, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may include one or more levels of on-board cache.

System memory 604 may include computer system readable media in the form of volatile memory, such as random access memory (RAM) 622 or cache memory 624. Computer system 601 may further include other removable/non-removable, volatile/non-volatile computer system storage media. By way of example only, storage system 626 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

One or more programs/utilities 628, each having at least one set of program modules 630 may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 628 and/or program modules 630 generally perform the functions or methodologies of various embodiments.

In some embodiments, the program modules 630 of the computer system 601 may include a dynamic password generation module. The password generation model may include computer instructions to obtain user activity data, analyze the user activity data, determine whether the user activity data is secure, verify the user activity data, and generate one or more security challenges and corresponding passwords based on the analysis of the user activity data.

Although the memory bus 603 is shown in FIG. 6 as a single bus structure providing a direct communication path among the CPUs 602, the memory subsystem 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A method of dynamically generating a security challenge and a password corresponding to the security challenge, the method comprising:
  obtaining a set of user activity data from a video source;
  verifying an integrity of the set of user activity data, wherein verifying the integrity of the set of user activity data further comprises:
    obtaining a set global positioning system (GPS) data, wherein the set of GPS data includes a GPS location and a GPS timing;
    comparing the GPS location and GPS timing of the set of GPS data to a user activity data location and a user activity data timing of the set of user activity data; and
    determining, in response to the GPS location and GPS timing matching the user activity data location and the user activity data timing, that the set of user activity data is verified;
  analyzing, in response to a determination that the set of user activity data is verified, the set of user activity data, wherein analyzing the set of user activity data further comprises:
    determining a number of entities with knowledge of the set of user activity data;
  generating a security rating based on the analysis of the set of user activity data, wherein the security rating is based on the number of entities with knowledge of the set of user activity data;
  comparing the security rating to a first security threshold, wherein the first security threshold specifies a first number of entities with knowledge of the set of user activity data;
  comparing the security rating to a second security threshold, wherein the second security threshold specifies a second number of entities with knowledge of the set of user activity data;
  determining, in response to the security rating satisfying the first security threshold but not satisfying the second security threshold, that the set of user activity data is potentially not secure;
  determining, in response to the security rating not satisfying the first security threshold and not satisfying the second security threshold, that the set of user activity data is not secure;
  determining, in response to a determination that the set of user activity data is potentially not secure, a historical reach of the user activity data;
  comparing the historical reach of the user activity data to a historical reach threshold; and
  determining, in response to the historical reach of the user activity data satisfying the historical reach threshold, that the set of user activity data is secure;
  generating, in response to a determination that the set of user activity data is secure, the security challenge and the password corresponding to the security challenge based on the set of user activity data, wherein the password is a correct response to the security challenge.

* * * * *